US011892141B1

(12) United States Patent
Hung

(10) Patent No.: US 11,892,141 B1
(45) Date of Patent: Feb. 6, 2024

(54) LIGHT DEVICE WITH MOVABLE DRIVE POWER SUPPLY AND RECESSED DOWNLIGHT ASSEMBLY

(71) Applicant: ZHUHAI RISE LIGHTING CO., LTD., Zhuhai (CN)

(72) Inventor: Hao-Cheng Hung, Zhuhai (CN)

(73) Assignee: ZHUHAI RISE LIGHTING CO., LTD., Zhuhai (CN)

( * ) Notice: Subject to any disclaimer, the term of this patent is extended or adjusted under 35 U.S.C. 154(b) by 0 days.

(21) Appl. No.: 17/967,895

(22) Filed: Oct. 18, 2022

(30) Foreign Application Priority Data

Sep. 9, 2022 (CN) ......................... 202211107347.7

(51) Int. Cl.

| | |
|---|---|
| ***F21S 8/02*** | (2006.01) |
| ***F21V 21/30*** | (2006.01) |
| ***F21V 21/04*** | (2006.01) |
| ***F21V 23/00*** | (2015.01) |

(52) U.S. Cl.
CPC .............. *F21S 8/026* (2013.01); *F21V 21/04* (2013.01); *F21V 21/30* (2013.01); *F21V 23/008* (2013.01)

(58) Field of Classification Search
CPC .......... F21S 8/026; F21V 21/04; F21V 21/30; F21V 23/008
See application file for complete search history.

(56) References Cited

U.S. PATENT DOCUMENTS

| | | | | |
|---|---|---|---|---|
| 4,220,986 A * | 9/1980 | Matteo | F21V 23/02 | 362/362 |
| 4,791,539 A * | 12/1988 | Ewing | F21V 23/06 | 362/310 |
| 6,659,627 B2 * | 12/2003 | Caluori | F21S 8/02 | 362/370 |
| 7,210,826 B2 * | 5/2007 | Haugaard | F21V 23/026 | 362/373 |
| 7,430,120 B2 * | 9/2008 | Lau | H01J 65/048 | 361/674 |
| 9,206,968 B2 * | 12/2015 | Highbridge | F21V 23/008 | |
| 11,032,893 B2 * | 6/2021 | Major | H02G 3/20 | |
| 11,193,654 B2 * | 12/2021 | Parsons | F21V 29/773 | |
| 11,371,684 B1 * | 6/2022 | Hawkins | F21V 23/007 | |

* cited by examiner

*Primary Examiner* — Arman B Fallahkhair
(74) *Attorney, Agent, or Firm* — Bradley J. Thorson; DeWitt LLP

(57) ABSTRACT

A light device with movable drive power supply and a recessed downlight assembly. The light device includes a movable bracket assembly, a drive power supply and a light body. The movable bracket assembly includes a first movable arm and a second movable arm. A first and a second movable hinge sections are hinged with each other, whereby the first and the second movable arms can be rotated relative to each other. The drive power supply is disposed on the second movable arm and connected with the light body via a conductive wire. By means of the relative rotation of the first and the second movable arms, the drive power supply and the second movable arm pass through a mounting hole to outside of a mounting panel. Such that, the drive power supply can be conveniently connected with the conductive wire of the light body.

4 Claims, 7 Drawing Sheets

LIGHT DEVICE WITH MOVABLE DRIVE POWER SUPPLY AND RECESSED DOWNLIGHT ASSEMBLY

BACKGROUND OF THE INVENTION

1. Field of the Invention

The present invention relates generally to a light device, and more particularly to a light device with movable drive power supply and a recessed downlight assembly.

2. Description of the Related Art

In recent years, more and more users have applies LED to conventional lighting products such as cup lights, downlights or recessed downlights to satisfy the requirement for indoor illumination. In general, the conventional downlight necessitates a cooperative drive power supply for converting input electrical energy into necessary working electrical energy. The downlight is generally inlaid in a ceiling, a wall body or a box body with the drive power supply hidden therein. The drive power supply is not securely located in a fixed position and has no drawing track. As a result, it is inconveniently to install or replace the drive power supply or the light device and the light device can be hardly securely installed.

SUMMARY OF THE INVENTION

It is therefore a first object of the present invention to provide a light device with movable drive power supply, which can be conveniently drawn out and hidden.

It is a second object of the present invention to provide a recessed downlight assembly having the above light device with movable drive power supply.

To achieve the first object of the present invention, the light device with movable drive power supply of the present invention includes a movable bracket assembly, a drive power supply and a light body. The movable bracket assembly includes a first movable arm and a second movable arm. A fixed hinge section and a first movable hinge section are respectively disposed at two ends of the first movable arm. A second movable hinge section is disposed at one end of the second movable arm. The first movable hinge section and the second movable hinge section are hinged with each other, whereby the first movable arm and the second movable arm can be rotated relative to each other. The drive power supply is disposed on the second movable arm. The light body is connected with the drive power supply via a conductive wire.

In the above light device, the movable bracket assembly further includes a mounting support. The drive power supply is disposed on the mounting support. The mounting support is engaged with the second movable arm.

In the above light device, the second movable arm is formed with at least one engagement window and at least one engagement tongue is disposed on the mounting support. The engagement tongue is engaged with the engagement window.

In the above light device, the movable bracket assembly further includes multiple retaining screws, which pass through the second movable arm and the mounting support.

In the above light device, the movable bracket assembly further includes a fixed support. The fixed hinge section is hinged with the fixed support, whereby the first movable arm can be rotated relative to the fixed support.

To achieve the second object of the present invention, the recessed downlight assembly of the present invention includes a movable bracket assembly, a drive power supply, a light body and a fixed body. The movable bracket assembly includes a first movable arm and a second movable arm. A fixed hinge section and a first movable hinge section are respectively disposed at two ends of the first movable arm. A second movable hinge section is disposed at one end of the second movable arm. The first movable hinge section and the second movable hinge section are hinged with each other, whereby the first movable arm and the second movable arm can be rotated relative to each other. The drive power supply is disposed on the second movable arm. The fixed body has a mounting panel. A mounting hole is formed through the mounting panel. The mounting panel has an inner end face on an inner side. The movable bracket assembly is positioned on the inner side of the mounting panel. The fixed hinge section is hinged with the inner end face, whereby the drive power supply and the second movable arm can pass through the mounting hole to extend to an outer side of the mounting panel. The light body is connected with the drive power supply via a conductive wire. The light body is installed in the mounting hole.

In the above recessed downlight assembly, the movable bracket assembly further includes a mounting support. The drive power supply is disposed on the mounting support. The mounting support is engaged with the second movable arm.

In the above recessed downlight assembly, the second movable arm is formed with at least one engagement window and at least one engagement tongue is disposed on the mounting support. The engagement tongue is engaged with the engagement window.

In the above recessed downlight assembly, the movable bracket assembly further includes multiple retaining screws, which pass through the second movable arm and the mounting support.

In the above recessed downlight assembly, the movable bracket assembly further includes a fixed support. The fixed support is securely connected with the inner end face. The fixed hinge section is hinged with the fixed support, whereby the first movable arm can be rotated relative to the fixed supports.

The present invention is advantageous over the conventional light device in that the first movable arm and the second movable arm can be rotated relative to each other, whereby the drive power supply and the second movable arm can pass through the mounting hole to extend to the outer side of the mounting panel. In this case, the drive power supply can be conveniently connected with the conductive wire of the light body. Moreover, by means of the engagement between the mounting support and the second movable arm, the drive power supply can be conveniently secured to the second movable arm. Then, the drive power supply is retreated from the mounting hole back to the inner side of the mounting panel in a motional track regulated by the first movable arm and the second movable arm and hidden in the fixed body. Then the light body is installed in the mounting hole to complete the installation of the recessed downlight assembly. The recessed downlight assembly of the present invention can be easily operated and the components of the recessed downlight assembly can be securely mounted in their true positions.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
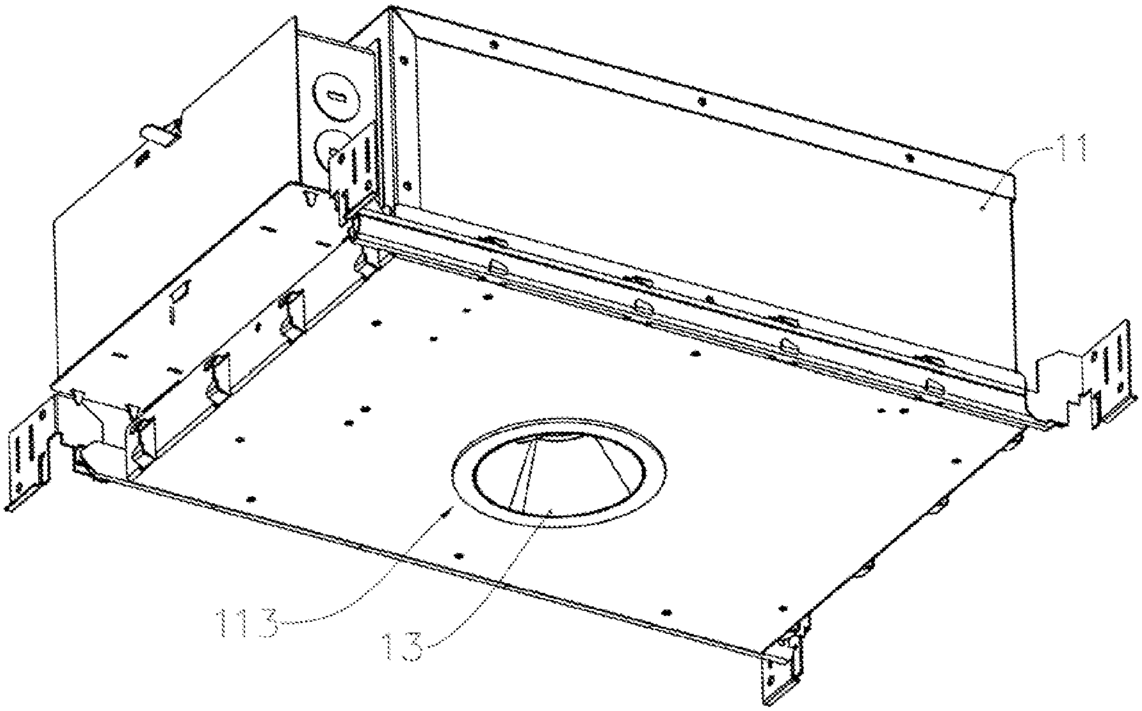
FIG. 1 is a perspective view of a preferred embodiment of the recessed downlight assembly of the present invention.
Figure 2:
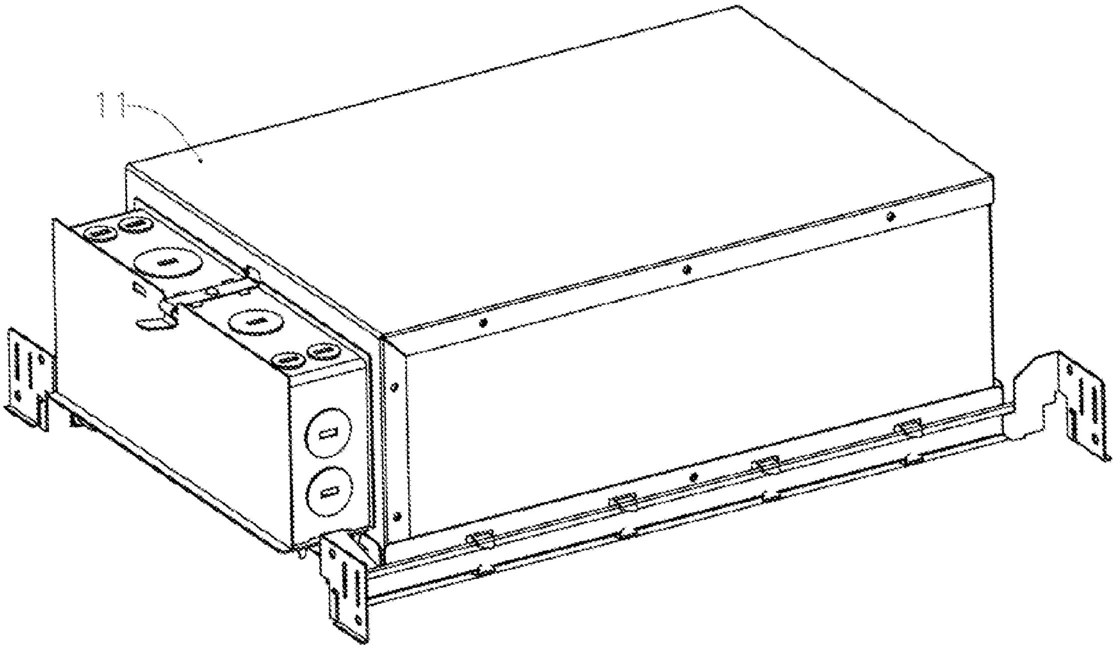
FIG. 2 is a perspective view of the preferred embodiment of the recessed downlight assembly of the present invention, seen by another angle.
Figure 3:
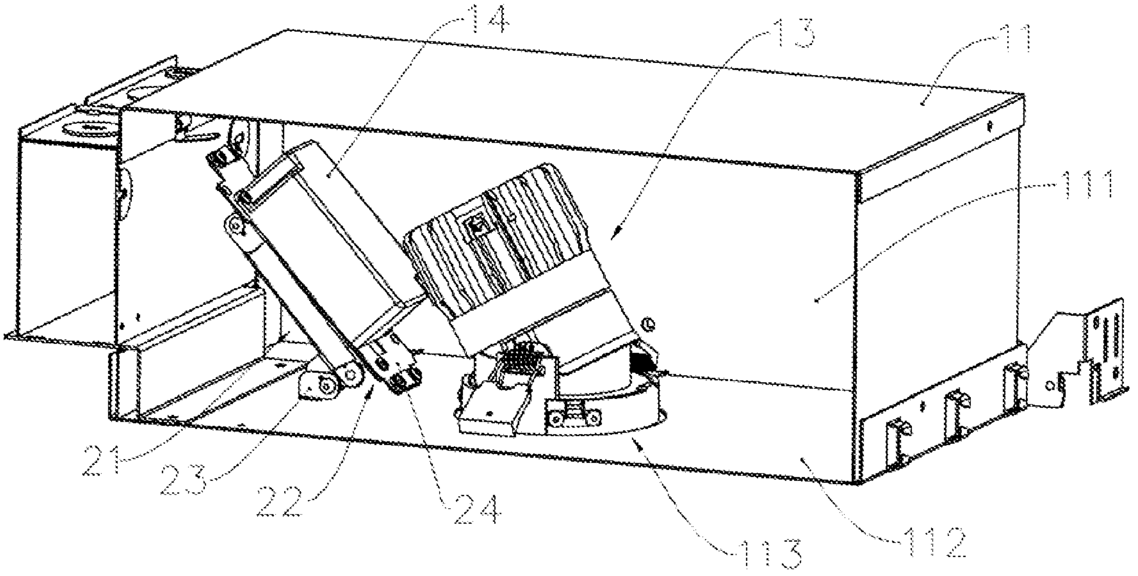
FIG. 3 is a perspective view of the preferred embodiment of the recessed downlight assembly of the present invention, which is hidden in the fixed body.
Figure 4:
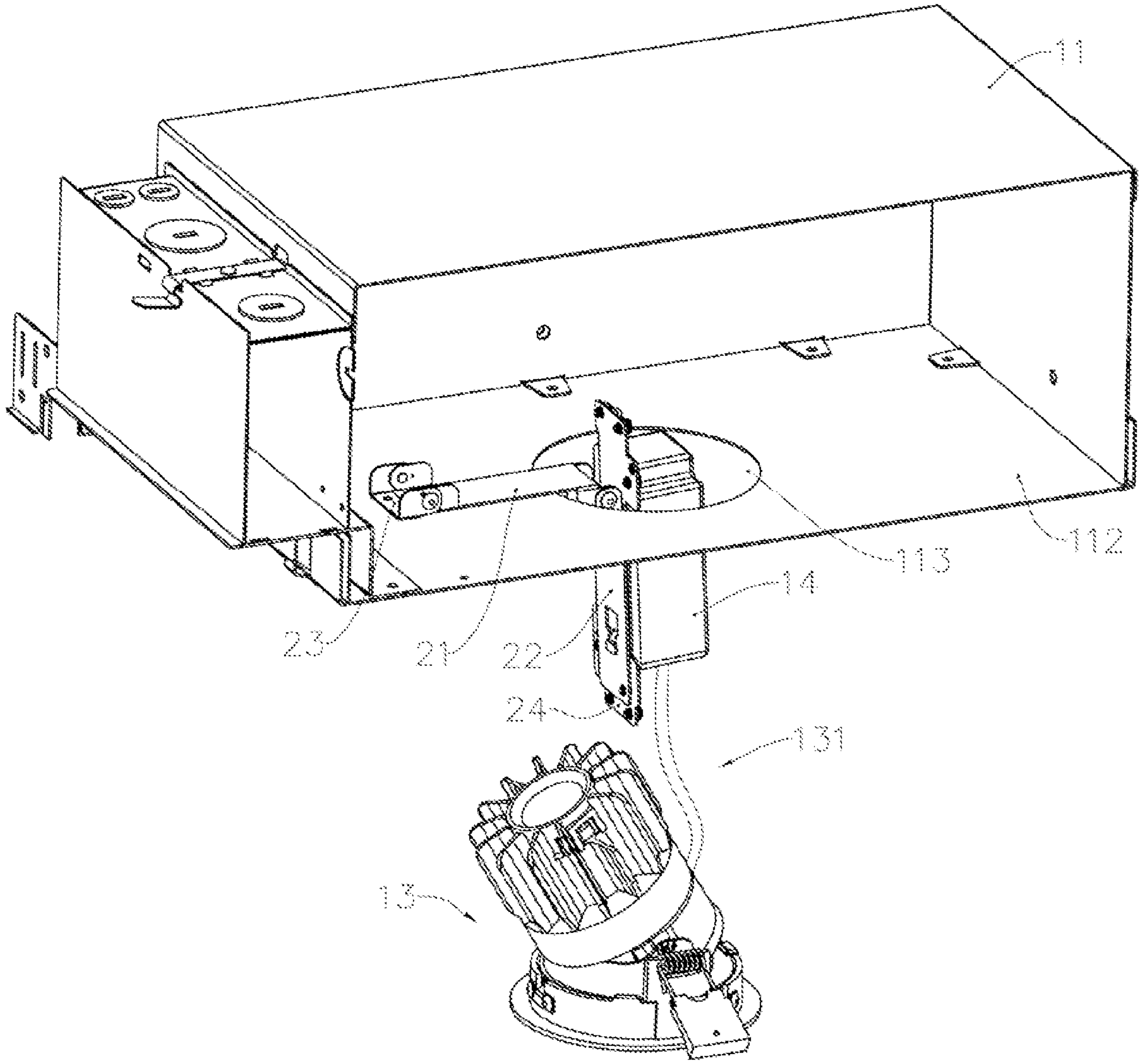
FIG. 4 is a perspective view of the preferred embodiment of the recessed downlight assembly of the present invention, which is pulled out from the fixed body.
Figure 5:
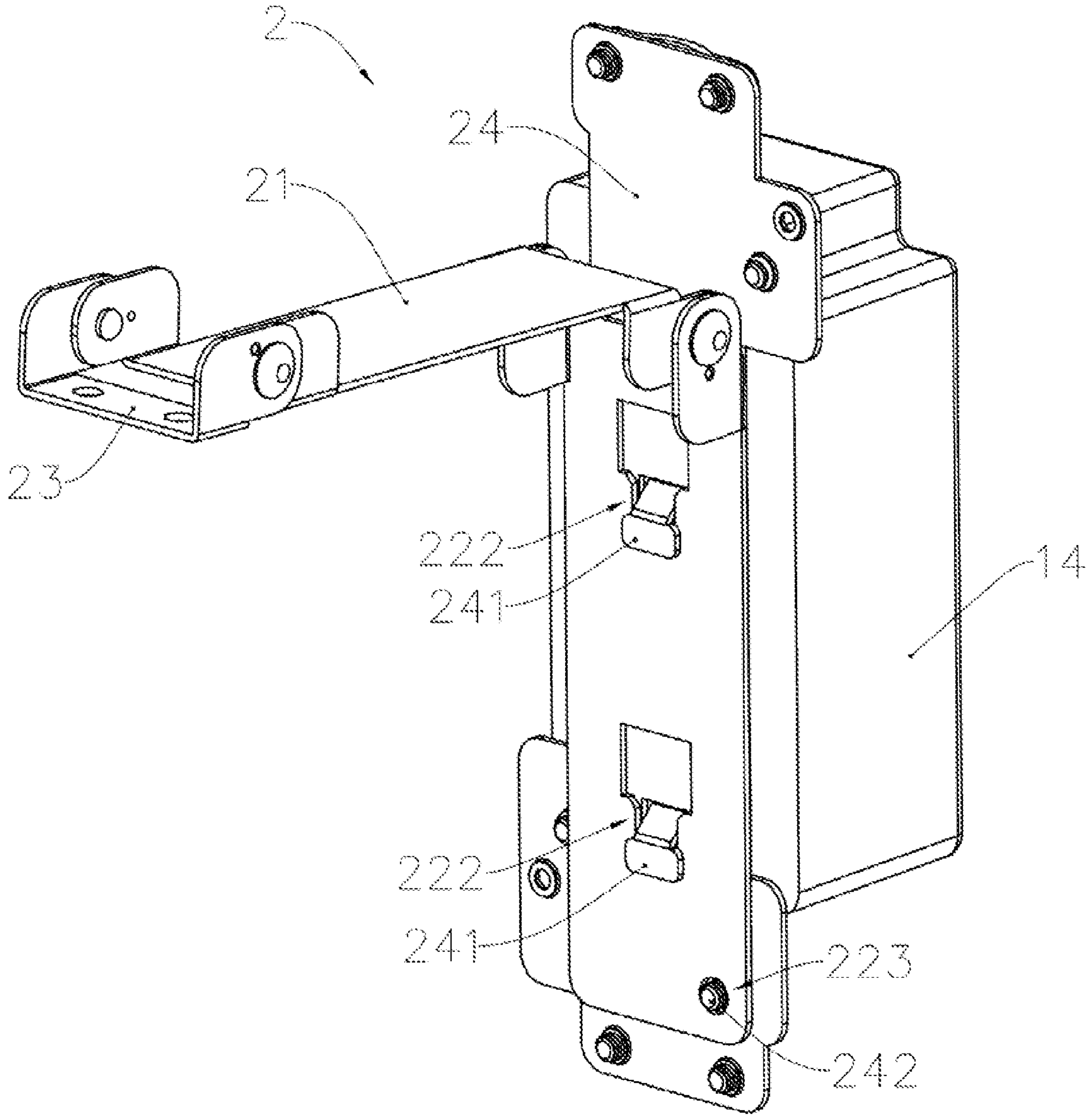
FIG. 5 is a perspective assembled view of the movable bracket assembly of the preferred embodiment of the recessed downlight assembly of the present invention.
Figure 6:
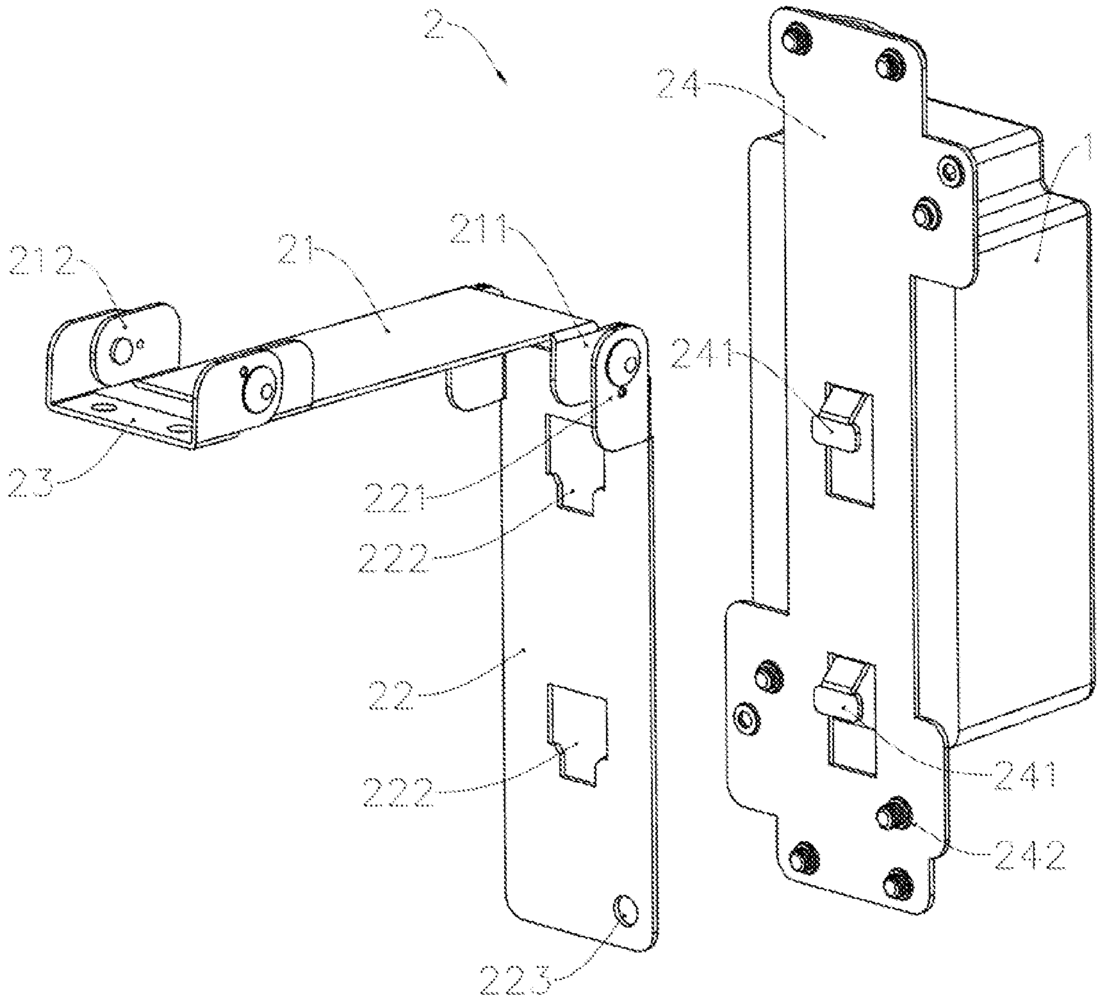
FIG. 6 is a perspective exploded view of the movable bracket assembly of the preferred embodiment of the recessed downlight assembly of the present invention.

Please refer to FIGS. 1 to 6. The recessed downlight assembly of the present invention includes a movable bracket assembly 2, a drive power supply 14, a light body 13 and a fixed body 11. The movable bracket assembly 2, the drive power supply 14 and the light body 13 together form a light device. The movable bracket assembly 2 includes a first movable arm 21, a second movable arm 22, a fixed support 23 and a mounting support 24. Multiple fixed hinge sections 212 and multiple first movable hinge sections 211 are respectively disposed at two ends of the first movable arm 21. Multiple second movable hinge sections 221 are disposed at one end of the second movable arm 22. The first movable hinge sections 211 and the second movable hinge sections 221 are hinged with each other. The first movable hinge sections 211 and the second movable hinge sections 221 are hinged with each other by means of rivets or screws or other commonly used connection components. Accordingly, the first movable arm 21 and the second movable arm 22 can be rotated relative to each other.

The second movable arm 22 is formed with two engagement windows 222. Two engagement tongues 241 are disposed on the mounting support 24. The engagement tongues 241 are engaged with the engagement windows 222. A retaining hole 223 is formed on the second movable arm 22. Multiple retaining screws 242 pass through the second movable arm 22 and the mounting support 24 to connect with the retaining hole 223. The drive power supply 14 is mounted on the mounting support 24.

In this embodiment, the fixed body 11 has the form of a box body. The fixed body 11 defines a receiving chamber 111. A mounting panel 112 is disposed on a lower side of the fixed body 11. Multiple mounting holes 113 are formed through the mounting panel 112. The mounting panel 112 has an inner end face on an inner side. The movable bracket assembly 2 is positioned on the inner side of the mounting panel 112. The fixed support 23 is securely connected with the inner end face. The fixed hinge sections 212 are hinged with the fixed support 23, whereby the first movable arm 21 can be rotated within the receiving chamber 111 relative to the fixed support 23.

When installing the light device, the second movable arm 22 is passed through the mounting hole 113 to extend to an outer side of the mounting panel 112. The first movable arm 21 is connected with the inner end face. Then the mounting support 24 and the drive power supply 14 are mounted on the second movable arm 22. The light body 13 is connected with the drive power supply 14 via a conductive wire 131. Then the second movable arm 22 and the drive power supply 14 are retreated from the mounting hole 113 back to the inner side of the mounting panel 112. Then the first movable arm 21 and the second movable arm 22 are folded onto each other and the drive power supply 14 is stably positioned on the second movable arm 22. Finally, the light body 13 is installed in the mounting hole 113.

Figure 7:
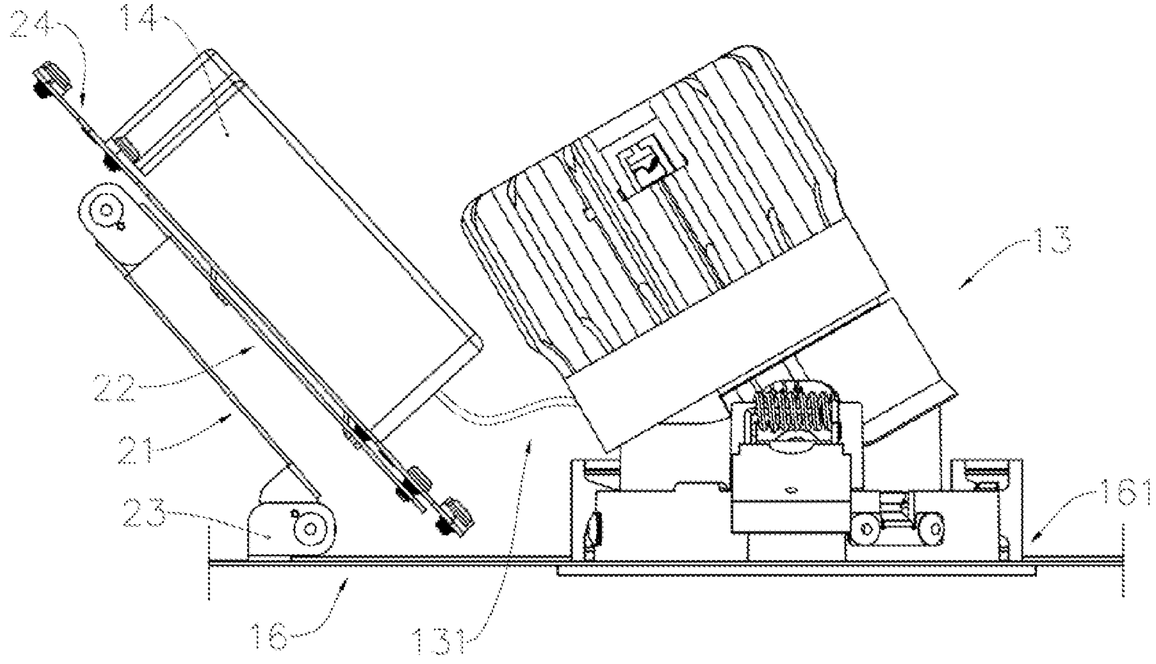
FIG. 7 is a side view of another embodiment of the recessed downlight assembly of the present invention, showing the installation thereof.

Please refer to FIG. 7. The fixed body 16 alternatively can be a ceiling, a wall body, etc. The fixed body 16 is formed with a mounting hole 161. The fixed support 23 is securely disposed on the inner end face of the mounting panel of the fixed body 16. Accordingly, the movable bracket assembly 2 and the drive power supply 14 can be hidden in the fixed body 16.

Some modified embodiments of the above preferred embodiments of the present invention can achieve the same object of the present invention. For example, the fixed hinge sections 212 of the first movable arm 21 can be alternatively directly hinged with the fixed body 16. Also, the drive power supply 14 can be directly mounted on the second movable arm 22. According to the above arrangement, the first movable arm 21 and the second movable arm 22 can be rotated relative to each other, whereby the drive power supply 14 and the second movable arm 22 can pass through the mounting hole 161 to extend to the outer side of the mounting panel. In this case, the drive power supply 14 can be conveniently connected with the conductive wire 131 of the light body 13. In addition, the engagement tongues 241 of the mounting support 24 are engaged with the engagement windows 222 of the second movable arm 22, whereby the drive power supply 14 can be conveniently secured to the second movable arm 22. Then the drive power supply 14 is retreated from the mounting hole 113 back to the inner side of the mounting panel 112 in a motional track regulated by the first movable arm 21 and the second movable arm 22 and hidden in the fixed body. Then the light body 13 is installed in the mounting hole 113 to complete the installation of the recessed downlight assembly. The recessed downlight assembly of the present invention can be easily operated and the components of the recessed downlight assembly can be securely mounted in their true positions.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A light device with movable drive power supply comprising:

a box body having a mounting panel defining a lower wall of the box body, the mounting panel defining a mounting hole;

a light body removably received in the mounting hole;

a movable bracket assembly, the movable bracket assembly including a first movable arm and a second movable arm, a first end of the first movable arm pivotally coupled to an upper surface of the mounting panel, a second end of the first movable arm pivotally coupled to a first end of the second movable arm with a hinge, wherein the movable bracket assembly is selectively shiftable between a folded position wherein the second movable arm abuts and is parallel to the first movable arm, and an unfolded position wherein the first movable arm abuts the mounting panel and the second end of the first movable arm extends part-way over the mounting hole and the second movable arm extends through the mounting hole;

a drive power supply operably coupled to the second movable arm with a mounting support, the drive power supply electrically coupled with an electrical power source;

the light body being connected with the drive power supply via a conductive wire;

wherein the movable bracket assembly and the drive power supply are completely received in the box body when the movable bracket assembly is in the folded position, and the drive power supply is extended through the mounting hole when the movable bracket assembly is in the unfolded position.

2. The light device as claimed in claim 1, characterized in that the movable bracket assembly further includes multiple retaining screws, which pass through the second movable arm and the mounting support.

3. A recessed downlight assembly comprising:

a box body having a mounting panel defining a lower wall of the box body, the mounting panel defining a mounting hole;

a light body removably received in the mounting hole;

a movable bracket assembly, the movable bracket assembly including a first movable arm and a second movable arm, a first end of the first movable arm pivotally coupled to an upper surface of the mounting panel, a second end of the first movable arm pivotally coupled to a first end of the second movable arm with a hinge, wherein the movable bracket assembly is selectively shiftable between a folded position wherein the second movable arm abuts and is parallel to the first movable arm, and an unfolded position wherein the first movable arm abuts the mounting panel and the second end of the first movable arm extends part-way over the mounting hole and the second movable arm extends through the mounting hole;

a drive power supply operably coupled to the second movable arm with a mounting support, the drive power supply electrically coupled with an electrical power source;

the light body being connected with the drive power supply via a conductive wire;

wherein the movable bracket assembly and the drive power supply are completely received in the box body when the movable bracket assembly is in the folded position, and the drive power supply is extended through the mounting hole when the movable bracket assembly is in the unfolded position.

4. The recessed downlight assembly as claimed in claim 3, characterized in that the movable bracket assembly further includes multiple retaining screws, which pass through the second movable arm and the mounting support.

* * * * *